(12) United States Patent
Tomczyk

(10) Patent No.: US 8,068,283 B2
(45) Date of Patent: Nov. 29, 2011

(54) LENTICULAR CARD AND PROCESS FOR MAKING

(75) Inventor: John Tomczyk, Shoreview, MN (US)

(73) Assignee: Travel Tags, Inc., North Mankato, MN (US)

( * ) Notice: Subject to any disclaimer, the term of this patent is extended or adjusted under 35 U.S.C. 154(b) by 0 days.

(21) Appl. No.: 12/480,306

(22) Filed: Jun. 8, 2009

(65) Prior Publication Data
US 2009/0251787 A1 Oct. 8, 2009

Related U.S. Application Data

(60) Continuation of application No. 11/981,681, filed on Oct. 31, 2007, now Pat. No. 7,545,566, and a continuation of application No. 11/981,836, filed on Oct. 31, 2007, now Pat. No. 7,545,567, said application No. 11/981,681 is a division of application No. 11/296,736, filed on Dec. 7, 2005, now Pat. No. 7,545,565, said application No. 11/981,836 is a division of application No. 11/296,736, which is a continuation of application No. 11/067,119, filed on Feb. 25, 2005, now Pat. No. 7,075,725, which is a continuation of application No. 10/406,614, filed on Apr. 3, 2003, now Pat. No. 6,900,944, which is a continuation of application No. PCT/US01/46682, filed on Nov. 2, 2001.

(60) Provisional application No. 60/245,404, filed on Nov. 2, 2000.

(51) Int. Cl.
*G02B 27/10* (2006.01)
*G06K 19/00* (2006.01)

(52) U.S. Cl. .............................. 359/619; 235/487
(58) Field of Classification Search .......... 359/619; 235/487, 380, 375; 428/142, 156, 195.1, 428/40.1
See application file for complete search history.

(56) References Cited

U.S. PATENT DOCUMENTS

| | | |
|---|---|---|
| 3,264,164 A | 8/1966 | Jerothe et al. |
| 3,692,312 A | 9/1972 | Meyer |
| 3,984,242 A | 10/1976 | Lamberts et al. |
| 3,992,206 A | 11/1976 | Lamberts |
| RE29,091 E | 12/1976 | De Palma et al. |

(Continued)

FOREIGN PATENT DOCUMENTS

DE 296 21 588 U1 1/1997
(Continued)

OTHER PUBLICATIONS

U.S. Appl. No. 12/170,858, filed Jul. 10, 2008, Tomcyzk.
(Continued)

*Primary Examiner* — Mohammed Hasan
(74) *Attorney, Agent, or Firm* — Patterson Thuente Christensen Pedersen, P.A.

(57) ABSTRACT

A lenticulated sheet including a polymeric backing sheet, an imaged transparent sheet having a first smooth side and a second side with a lenticulated region, the transparent sheet optionally having at least one printed image area on the first smooth side and an adhesive layer over the printed image areas and non-image areas of the first smooth side. Air is removed from between the backing layer and the lenticular layer second side, and the adhesive layer is adapted to join the backing layer and the lenticular layer second side. The invention also provides processes useful for preparing a lenticular card including an optional core sheet, or optional primer layers.

24 Claims, 2 Drawing Sheets

U.S. PATENT DOCUMENTS

| | | | |
|---|---|---|---|
| 4,128,324 | A | 12/1978 | Seeger |
| 4,175,750 | A | 11/1979 | Rugheimer et al. |
| 4,414,316 | A | 11/1983 | Conley |
| 4,724,449 | A | 2/1988 | Wright |
| 4,869,946 | A | 9/1989 | Clay |
| 4,897,533 | A | 1/1990 | Lyszczarz |
| 4,920,039 | A | 4/1990 | Fotland et al. |
| 4,935,335 | A | 6/1990 | Fotland |
| 5,034,982 | A | 7/1991 | Heninger et al. |
| 5,098,302 | A | 3/1992 | Sekiguchi |
| 5,100,330 | A | 3/1992 | Sekiguchi |
| 5,101,436 | A | 3/1992 | DeAguiar et al. |
| 5,108,531 | A | 4/1992 | Quadracci |
| 5,161,979 | A | 11/1992 | Sekiguchi |
| 5,197,886 | A | 3/1993 | Sekiguchi |
| 5,276,478 | A | 1/1994 | Morton |
| 5,279,912 | A | 1/1994 | Telfer et al. |
| 5,330,799 | A | 7/1994 | Sandor et al. |
| 5,362,351 | A | 11/1994 | Karszes |
| 5,364,274 | A | 11/1994 | Sekiguchi |
| 5,365,294 | A | 11/1994 | Anderson |
| 5,391,254 | A | 2/1995 | Morton |
| 5,424,553 | A | 6/1995 | Morton |
| RE35,029 | E | 8/1995 | Sandor et al. |
| 5,466,723 | A | 11/1995 | Dotson |
| 5,473,406 | A | 12/1995 | Hassall et al. |
| 5,488,451 | A | 1/1996 | Goggins |
| 5,492,578 | A | 2/1996 | Morton |
| 5,494,445 | A | 2/1996 | Sekiguchi et al. |
| 5,532,786 | A | 7/1996 | Hassall et al. |
| 5,543,964 | A | 8/1996 | Taylor et al. |
| 5,581,402 | A | 12/1996 | Taylor |
| 5,642,226 | A | 6/1997 | Rosenthal |
| 5,715,383 | A | 2/1998 | Schindler et al. |
| 5,724,758 | A | 3/1998 | Gulick, Jr. |
| 5,753,344 | A | 5/1998 | Jacobsen |
| 5,759,328 | A | 6/1998 | Richwine et al. |
| 5,768,143 | A | 6/1998 | Fujimoto |
| 5,833,789 | A | 11/1998 | Rosendale et al. |
| 5,870,224 | A | 2/1999 | Saitoh et al. |
| 5,933,276 | A | 8/1999 | Magee |
| 5,942,062 | A | 8/1999 | Hassall et al. |
| 5,944,356 | A | 8/1999 | Bergmann et al. |
| 6,016,225 | A | 1/2000 | Anderson |
| 6,073,854 | A | 6/2000 | Bravenec et al. |
| 6,176,430 | B1 | 1/2001 | Finkelstein et al. |
| 6,185,042 | B1 * | 2/2001 | Lomb et al. ................. 359/619 |
| 6,277,232 | B1 | 8/2001 | Wang et al. |
| 6,296,188 | B1 | 10/2001 | Kickhaefer |
| RE38,106 | E | 5/2003 | Bravenec et al. |
| 6,574,047 | B2 * | 6/2003 | Hawver ..................... 359/626 |
| 6,758,936 | B1 * | 7/2004 | Kiekhaefer et al. ......... 156/277 |
| 6,843,009 | B2 * | 1/2005 | Kainen ........................ 40/454 |
| 6,870,681 | B1 | 3/2005 | Magee |
| 6,900,944 | B2 | 5/2005 | Tomczyk |
| 7,075,725 | B2 | 7/2006 | Tomczyk |
| 2004/0176550 | A1 | 9/2004 | McQuaid |
| 2006/0146299 | A1 | 7/2006 | Tomczyk |
| 2008/0117520 | A1 | 5/2008 | Tomczyk |
| 2008/0123195 | A1 | 5/2008 | Tomczyk |

FOREIGN PATENT DOCUMENTS

| | | |
|---|---|---|
| EP | 0 145 481 A2 | 6/1985 |
| EP | 1 046 515 A1 | 10/2000 |
| JP | 3249046 A | 11/1991 |
| WO | WO96/24490 A1 | 8/1996 |

OTHER PUBLICATIONS

ISO/IEC 7810:1995(E), "Identification Cards—Physical Characteristics," Aug. 15, 1995, pp. i-iii and pp. 1-5.
ISO/IEC 7816-1,"Identification Cards—Integrated Circuit(s) Cards With Contacts," Jul. 1, 1987, pp. 1-4.
Deposition of William Cahill; *Travel Tags, Inc. v. Performance Printing Corp.*; Court File 06-CV-2970; Oct. 30, 2007.
First Amended Complaint: *Travel Tags, Inc. v. Performance Printing Corp.*; Court File No. 06-cv-2970 DWF/SRN; Dec. 20, 2006.
Answer and Counterclaims of Defendant: *Travel Tags, Inc. v. Performance Printing Corp.*; Court File No. 06-cv-2970 JNE/JJG; Nov. 21, 2006.
Response to Defendant's Answer and Counterclaims; *Travel Tags, Inc. v. Performance Printing Corp.*; Court File No. 06-cv-2970 DWF/SRN; Dec. 11, 2006.
Defendant's First Set of Interrogatories to Plaintiff; *Travel Tags, Inc. v. Performance Printing Corp.*; Court File No. 06-cv-2970 JNE/JJG; May 18, 2007.
Plaintiff's Answers to Defendant's First Set of Interrogatories to Plaintiff; *Travel Tags, Inc. v. Performance Printing Corp.*; Court File No. 06-cv-2970 DWF/SRN; Jun. 20, 2007.
Defendant's First Set of Requests for Production of Documents to Plaintiff; *Travel Tags, Inc. v. Performance Printing Corp.*; Court File No. 06-cv-2970 JNE/JJG; May 18, 2007.
Plaintiff's Responses to Defendant's First Set of Request for Production of Documents to Plaintiff: *Travel Tags, Inc. v. Performance Printing Corp.*; Court File No. 06-cv-2970 DWF/SRN; Jun. 20, 2007.
Plaintiff Travel Tags, Inc.'s Prior Art Statement; *Travel Tags, Inc. v. Performance Printing Corp.*; Court File No. 06-cv-2970 DWF/SRN; May 1, 2007.
Defendant Performance Printing Corporation's Prior Art Statement; *Travel Tags, Inc. v. Performance Printing Corp.*; Court File No. 06-cv-2970 DWF/SRN; Apr. 2, 2007.
Defendant's Opinion of Counsel re: Consideration of U.S. Patent No. 7,075,725 (Privilege waived in course of litigation).
Defendant's Memorandum in Support of its Motion for Summary Judgment on its Counterclaims and Plaintiff's Claims for Relief; *Travel Tags, Inc. v. Performance Printing Corp.*; Court File No. 06-cv-2970 DWF/SRN; Jun. 23, 2008.
Plaintiff's Memorandum in Support of Plaintiff's Motion to Dismiss, or Alternatively, in Opposition to Defendant's Summary Judgment Motion on its Patent Misuse Counterclaim; Court File No. 06-cv-2970 DWF/SRN; Jul. 15, 2008.
Defendant's Reply to Plaintiff's Memorandum in Support of its Motion to Dismiss; *Travel Tags, Inc. v. Performance Printing Corp.*; Court File No. 06-cv-2970 DWF/SRN; Aug. 8, 2008.
Plaintiff's Reply Memorandum in Support of Plaintiff's Motion to Dismiss and in Opposition to Defendant's Request for Attorneys' Fees; Travel Tags, *Travel Tags, Inc. v. Performance Printing Corp.*; Court File No. 06-cv-2970 DWF/SRN; Aug. 15, 2008.
Declaration of John Tomczyk.
http://www.artn.nwu.edu (Various pages).
http://www.networks.digital.com/npb/dr/stories/quad.tx.
File History for U.S. Patent No. 6,900,944, filed Apr. 3, 2003.
File History for U.S. Patent No. 7,075,725 filed Feb. 25, 2005.
File History for U.S. Patent No. 7,545,565 filed Dec. 7, 2005.
File History for U.S. Patent No. 7,545,566 filed Oct. 31, 2007.
File History for U.S. Patent No. 7,545,567 filed Oct. 31, 2007.
File History for U.S. Appl. No. 12/170,858, filed Jul. 10, 2008 (reissue of U.S. Patent No. 7,075,725).
File History for EP Application No. 01987294.4 filed Apr. 4, 2002.
Declaration of John Tomczyk, dated Jan. 12, 2009.
Printout from web address: http://www.artn.nwu.edu (Various pages), dated May 9, 1996.
Printout from web address: http://www.networks.digital.com/npb/dr/stories/quad.tx, dated May 9, 1996.
Office Action dated Sep. 28, 2010 for U.S. Appl. No. 12/170,858, filed Jul. 10, 2008.
EP Office Action dated Nov. 4, 2010 for Application No. 01987294.4.
EP Office Action dated Jul. 22, 2011 for EP Application No. 01 987 294.4 filed Nov. 2, 2001, 3 pages.

* cited by examiner

LENTICULAR CARD AND PROCESS FOR MAKING

RELATED APPLICATIONS

This application is a continuation of U.S. application Ser. No. 11/981,681 entitled "LENTICULAR CARD AND PROCESSES FOR MAKING", filed Oct. 31, 2007, now U.S. Pat. No. 7,545,566, and this application is also a continuation of U.S. application Ser. No. 11/981,836 entitled "LENTICULAR CARD AND PROCESSES FOR MAKING", filed Oct. 31, 2007, now U.S. Pat. No. 7,545,567, both of which are a division of U.S. application Ser. No. 11/296,736 entitled "LENTICULAR CARD AND PROCESSES FOR MAKING," filed Dec. 7, 2005, now U.S. Pat. No. 7,545,565, which is a continuation of U.S. application Ser. No. 11/067,119 entitled "LENTICULAR CARD AND PROCESSES FOR MAKING," filed Feb. 25, 2005, now U.S. Pat. No. 7,075,725, which is a continuation of U.S. application Ser. No. 10/406,614 entitled "LENTICULAR CARD AND PROCESSES FOR MAKING," filed Apr. 3, 2003, now U.S. Pat. No. 6,900,944, which is a continuation under 35 U.S.C. 111(a) of International Application No. PCT/US01/46682 entitled "LENTICULAR CARD AND PROCESSES FOR MAKING," filed Nov. 2, 2001, and published in English as WO 02/40291 A2 on May 23, 2002, which claims priority from U.S. Provisional Application No. 60/245,404 entitled "30 MIL LENTICULAR CARD," filed Nov. 2, 2000, all of which are incorporated herein by reference in their entirety.

FIELD OF THE INVENTION

The present invention provides for a lenticular card, and processes for printing and making the card. More specifically the present invention provides processes for the preparation of printed lenticular cards having desired printed image properties, physical dimensions, and physical characteristics as described herein.

BACKGROUND OF THE INVENTION

The ability to litho-print a lenticular lens using a conventional off-set printing press configured with a UV Lamp is known in the art, see for example U.S. Pat. No. 6,073,854 below. The ability to adhere the printed lens to other plastic substrates and obtain a destructive bond between the lens and the substrate can be intricate and difficult, see for example, U.S. Pat. Nos. 5,473,406, and 5,532,786.

Processes for the preparation of articles with a lenticular surface are known, reference for example the following documents.

In U.S. Pat. No. 4,414,316, issued Nov. 8, 1983, to Conley, there is disclosed a flexible composite sheet material having a thermoset patterned relief surface of high quality and definition which is particularly useful for producing high quality optical sheet components such as a lenticular screen sheet for producing three-dimensional pictures and photographs. The composite sheet comprises a flexible base film having front and rear surfaces and a layer of a cured thermosetting polymer overlying the front surface of the base film. The cured thermosetting polymer layer has a nonplanar outer surface defining a predetermined desired relief pattern of high quality and durability and of fine definition in the thermosetting polymer layer. See for example Example I therein.

In U.S. Pat. No. 5,466,723, issued Nov. 14, 1995, to Dotson, there is disclosed a radiation curable adhesive composition which comprises from 15 to 85 percent by weight of beta-carboxyethyl acrylate and from 85 to 15 percent by weight of 2-phenoxyethyl acrylate based on the total weight of the composition. The adhesive provides improved adhesion for laminating a lineiform image sheet to a lenticular array sheet.

In U.S. Pat. No. 5,473,406 (apparatus), issued Dec. 5, 1995, and U.S. Pat. No. 5,532,786 (method), issued Jul. 2, 1996, both to Hassall, et al., there is disclosed an image sheet (12) coated with a radiation curable adhesive (48) at a coating station and then laminated to a lenticular array sheet (20) at a laminating station (50). A lamination of the image and array sheets is then positioned on an aligning station (56) where the lenticules of the array sheet are aligned with the image lines (16) of the image sheet. The adhesive is set at a curing station (60).

In U.S. Pat. No. 6,073,854, issued Jun. 13, 2000, to Bravenec et al., there is disclosed a card (10) for use as a telephone authorization card or the like is comprised of a layer of a backing material (20) such as a stiff plastic material which has some pliability. A thin sheet lenticular lens material (12) has a flat surface (14) on which is printed selected interlaced images. On the other side of the lens material is formed a plurality of lenticules (16) through which the images are viewed. The flat side of the lenticular material is secured to one face (22) of the backing in a convenient manner. A cutting tool is used to form an opening (32) in the outer face of the lenticules and a programmed microchip (30) is inserted in the opening and secured in place. On the outer face of the backing material a magnetic strip (40) containing magnetically encoded indicia is secured. The card is usable in a reader (R) which can scan the magnetic strip and read information from the microchip to allow the user to place a telephone call or conduct other transactions.

In U.S. Pat. No. 3,264,164, issued Aug. 2, 1966, to Jerothe et al., there is disclosed a color dynamic, three-dimensional flexible film and method of making the film. The film includes a transparent sheet having a lenticulated outer surface and line printed or image opposite surface.

In view of limitations of available processes for preparing lenticulated articles, such as efficiency and cost, a need exists for improved processes for the preparation of high quality lenticulated articles.

SUMMARY OF THE INVENTION

In accordance with the present invention, processes are provided for the preparation of lenticular articles including: A process for making a lenticular card comprising:

providing an imaged transparent sheet having a first smooth side and a second side with a lenticulated region, the transparent sheet having at least one printed image area on the first smooth side and a moisture cure adhesive layer over the printed image areas and non-image areas of the first smooth side, and the moisture cure adhesive layer being applied with a screen press through a screen; and combining the imaged transparent sheet on the adhesive layer side of the transparent sheet with a backing sheet by nipping the paired sheets with a nip roller;

A process for making a lenticular card comprising:

providing an imaged backing sheet having a first side and a second side, the backing sheet having a printed image on one side and a moisture cure adhesive layer over the printed image areas and non-image areas of the imaged side, and the moisture cure adhesive layer being applied with a screen press through a screen; and combining the backing sheet on the adhesive layer side with the first side of a transparent sheet having a first smooth side and a second side having a lenticulated region by nipping the paired sheets with a nip roller;

A process for making a lenticular card comprising:

providing an imaged transparent sheet having a first smooth side and a second side having a lenticulated region, the transparent sheet having a printed image on the first smooth side and a radiation curable adhesive layer over the printed image areas and non-image areas of the first smooth side, and the radiation curable adhesive layer being applied with a screen press through a screen;

activating the radiation curable adhesive by irradiating the adhesive layer; and combining a backing sheet with the transparent sheet on the resulting activated adhesive layer side of the transparent sheet by nipping the paired sheets with a nip roller; and A process for making a lenticular card comprising:

providing an imaged transparent sheet having a first smooth side and a second side with a lenticulated region, the imaged transparent sheet having a printed image on the first smooth side;

providing a backing sheet with a radiation curable adhesive layer on one side of the backing sheet, and the radiation curable adhesive layer being applied with a screen press through a screen;

combining the backing sheet with the imaged transparent sheet to form a composite sheet by nipping the paired sheets with a nip roller, the adhesive layer on the smooth side of the transparent sheet being interposed between the backing and transparent sheets; and irradiating the adhesive layer within the resulting composite sheet by directing radiation through the transparent sheet side of the composite sheet.

Thus, the present invention provides, in embodiments, economical processes for making lenticular cards articles with improved properties, such as improved indestructibility, as illustrated herein.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DETAILED DESCRIPTION OF THE INVENTION

Figure 1:
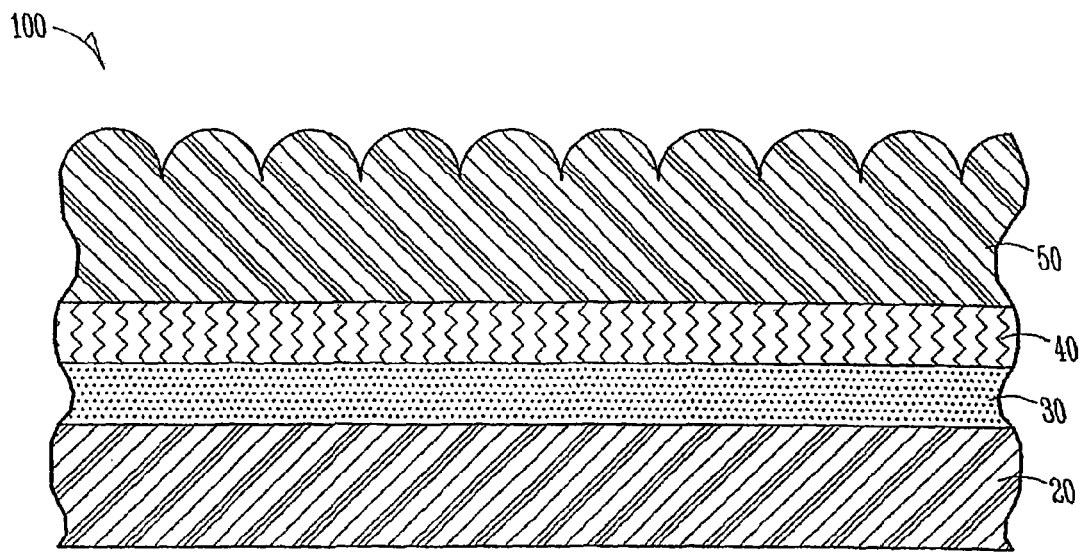
FIG. 1 illustrates a lenticular card embodiment of the present invention.

Applicants have discovered an improved and efficient process for making printed pieces, such as a credit/debit cards, gift cards, security card, phone cards, business cards, novelty cards, playing cards, trading cards, promotional cards, or like cards and which pieces include a lenticulated area on one or both sides of the finished card.

Definitions

The following definitions are used, unless otherwise described.

A "destructive bond" is generally a type of adhesive bond which once formed between two joined sheets or surfaces cannot be mechanically separated or undone without accompanying destruction or damage to two joined sheets or surfaces which destruction or damage is readily evident to an observer or detectable by a suitable equipped detector device.

"Transparent" as used in "transparent sheet" includes clear, semi-transparent, translucent, and the like adjectives that describe the ability of the sheet to either or both: transmit at least some light energy from a light or radiation source to the adhesive layer to effectuate the photo-curing of the adhesive, or alternatively, to transmit at least some light energy from a light or radiation source to the image layer to permit visualization or detection of the image by an observer or a machine.

The terms "include", "for example", "such as", and the like are used illustratively and are not intended to limit the present invention.

The indefinite articles "a" and "an" mean "at least one" or "one or more" when used in this application, including the claims, unless specifically indicated otherwise.

"Optional" or "optionally" mean that the subsequently described event or circumstance may but need not occur, and that the description includes instances where the event or circumstance occurs and instances in which it does not. For example, "optionally include a magnetic stripe" means that the magnetic stripe may be present but need not be present, and the description includes situations where the magnetic stripe is included and situations where the magnetic stripe is not included.

"Mils" or "mils" or "mil" is a unit of length equal to one thousandth (10-3) of an inch (0.0254 millimeter), used to specify, for example, the thickness of sheet materials.

The present invention provides durable phone, gift, membership, loyalty, and like cards, such as with an approximate overall thickness of about 30 mils, and which cards can optionally include a magnetic stripe and optionally can be imaged or printed by, for example, thermal or ink jet imaging methods, and which printed images optionally can be further encoded. Such cards have traditionally been made by, for example, compression lamination to meet ISO specifications. In a desire to differentiate themselves card-marketers and end-users desire card formats and appearance features with interesting visual effects. Examples include holographic film, clear cards, gift cards, and the like. The ability to efficiently produce cards having either or both an apparent 3-dimensional (3D) and an animating effect through a lenticular lens layer is desirable. Fulfilling the requirements that the card: has about 30 mil total thickness; has an encodable magnetic stripe; is thermally or ink jet imageable; and can be produced economically is a formidable challenge. See for example, ISO/IEC 7810:1995(E) "Identification Cards—Physical Characteristics" and ISO/IEC 7816-1:1987(E) "Identification Cards—Integrated circuit(s) cards with contacts."

Currently available methods can provide a lens sheet or lenticulated sheet array, which can vary in thickness, for example, from about 5 mils to about 35 mils, and from about 10 mils to about 30 mils. The thickness of the extruded lenticular lens layer is suggested by the formula:

$$r = C \times f$$

or $$r = [(n'-n)/n'] \times f$$

where r is the radius of curvature of a lenticular lens, C is a constant, f is the focal length of optimal focus thickness for the plastic, n' is the index of refraction of the lens construction material, such as an extruded plastic, and n is index of refraction of air. From the formula it is evident that the thicker the plastic the lower the pitch or lenticules per inch (LPI). The lower the pitch, the more coarse the lens. A coarse lens can give undesirable lens effects, for example, distortion of an underlying image. The desired pitch for a card of approximately 3⅜".times.2⅛" is for example between about 70 LPI and about 100 LPI. A coarser lens would require image graphics and text be significantly large, to avoid lens effects, and which lens effects are generally not desired by graphic designers. Thus to run a higher pitch lens a lenticular sheet plastic would need to be, for example, between 15 to about 20 mils thick and would need a white opaque sheet constructed of, for example, plastic mounted to the back of the lens to bring the card to a total thickness of about 30 mils. The opacity of the plastic backing sheet mounted to the back of the lens sheet, in embodiments, should be sufficiently opaque so as not to exhibit "show-through", that is, an image printed on the back of the plastic backing sheet should not be visible to an observer viewing the front surface of the lenticular card through the lenticular or smooth areas. The plastic backing sheet should also preferably be thermally imageable and constructed of a material that can be hot stamped, such as with an encodable magnetic stripe. Generally, for the card to be thermally imageable, the surface to be imaged should be very smooth and the plastic must be able to withstand the elevated temperatures of the thermal imaging process. Thermal imaging processes works well on, for example, laminated vinyl, polyester or co-polyester, such as polyethylene terephthalate glycol (PETG) and amorphous polyethylene terephthalate (APET, also known as poly(oxyethyleneoxyterephthaloyl)). Suitable polyesters, such as PETG 6763 and APET 9921, are commercially available in lenticulated form from, for example, Vinyl Plastics, Inc., Sheboygan Falls, Wis. See also EASTAPAK polyester 9921 and related materials from Eastman Chemical, affiliated or alternative suppliers. Clear PVC lenticular sheet material and PVC backing sheet material, commercially available from Goex, Janesville, Wis., were found to be a preferred materials because of their superior destructive bonding and imaging properties. UV curable Dymax adhesive material, commercially available from Dymax Corporation, was found to be a superior bonding adhesive, especially with PVC materials. Moisture cure adhesives were found to provide satisfactory bonding properties with polystyrene or polyester materials and was additionally advantaged by lower cost compared to the Dymax adhesive.

SUNCURE inks is a line of inks, commercially available from Sun Chemical, Carlstadt, N.J., and are examples of UV curable printing inks suitable for use in the present invention. Other inks suitable for use in the present invention are commercially available from, for example, Flint Inks, St. Paul, Minn.

Bonding the printed lens sheet and the opaque vinyl or polyester backer sheet proved cumbersome or resulted in product pieces with inferior quality, for example lacking the above mentioned indestructibility property, using prior art bonding methods. In the present invention, the desired bond can be, for example, an adhesive that dries to a solid and is destructive to the lens sheet, the optional core sheet if present, and the backer sheet if subsequent separation is attempted. Thus the processes of the present invention can further provide secure card articles which are either or both tamper resistant and tamper evident. In the present invention, the resulting card articles preferably satisfy one or more of the specification standards in the above mentioned ISO/IEC 7810. The present invention provides improved and alternative approaches to making lenticular cards having high quality printed images and which images can be, for example, printed externally, such as, on an opaque backing sheet, such as a bar code or a magnetic stripe, and printed internally and viewable through the either the lenticular or the smooth regions of the transparent or translucent front surface sheet.

Description of Preferred Embodiments

The following examples in conjunction with the accompanying figures provide illustrative and representative procedures for preparing card articles of the present invention. In embodiments the present invention provides a process for making a lenticular card comprising: providing an imaged transparent sheet having a first smooth side and a second side with a lenticulated region, the transparent sheet having at least one printed image area on the first smooth side and a moisture cure adhesive layer over the printed image areas and non-image areas of the first smooth side, and the moisture cure adhesive layer being applied with a screen press through a screen; and combining the imaged transparent sheet on the adhesive layer side of the transparent sheet with a backing sheet by nipping the paired sheets with a nip roller.

In embodiments the present invention also provides a process for making a lenticular card comprising:

providing an imaged backing sheet having a first side and a second side, the backing sheet having a printed image on one side and a moisture cure adhesive layer over the printed image areas and non-image areas of the imaged side, and the moisture cure adhesive layer being applied with a screen press through a screen; and combining the backing sheet on the adhesive layer side with the first side of a transparent sheet having a first smooth side and a second side having a lenticulated region by nipping the paired sheets with a nip roller.

In the above processes the adhesive layer can be, for example, activated prior to combining the sheets. The activation of the adhesive can, for example, displace solvent from the adhesive layer and shorten the adhesive cure time and provide in some instances improved destructive bonding. The above processes can further comprise post-curing the adhesive layer with heating.

In embodiments the present invention provides a process for making a lenticular card comprising:

providing an imaged transparent sheet having a first smooth side and a second side having a lenticulated region, the transparent sheet having a printed image on the first smooth side and a radiation curable adhesive layer over the printed image areas and non-image areas of the first smooth side, and the radiation curable adhesive layer being applied with a screen press through a screen;

activating the radiation curable adhesive by irradiating the adhesive layer; and combining a backing sheet with the transparent sheet on the resulting activated adhesive layer side of the transparent sheet by nipping the paired sheets with a nip roller.

In embodiments the present invention provides a process for making a lenticular card comprising:

providing an imaged transparent sheet having a first smooth side and a second side with a lenticulated region, the imaged transparent sheet having a printed image on the first smooth side;

providing a backing sheet with a radiation curable adhesive layer on one side of the backing sheet, and the radiation curable adhesive layer being applied with a screen press through a screen;

combining the backing sheet with the imaged transparent sheet to form a composite sheet by nipping the paired sheets with a nip roller, the adhesive layer on the smooth side of the transparent sheet being interposed between the backing and transparent sheets; and irradiating the adhesive layer within the resulting composite sheet by directing radiation through the transparent sheet side of the composite sheet.

In the above process involving irradiation, the irradiating can be accomplished, for example, by focused or unfocused ultraviolet light. The irradiating can cure the adhesive, for example, in from about 1 to about 20 seconds. Irradiation conditions can depend upon a number of process variables and the configuration of mechanical and processing components employed, such as web width and speed, lamp power ratings, lamp proximity, and the like considerations. Exemplary irradiation apparatus and conditions can be, for example: two metal halide ultraviolet (UV) lamps which deliver about 400 Watts per inch to a 42 inch wide web or belt of a lithographic press operating at from about 0.40 to about 100 feet per minute; or two medium pressure mercury vapor ultraviolet (UV) lamps which deliver about 300 Watts per inch to a 30 inch wide web or belt of a lithographic press operating at from about 50 to about 120 feet per minute. Other optimal web or belt speeds can be readily determined by trial and error in view of variability observed in cure rates based on, for example, differences in ink colors selected and their UV light adsorption properties, ink area coverage, and lamp intensity, and the like considerations, with the aid of, for example, a unicure radiometer by measuring power per unit area, such as in the range of about 0.25 Joules per square centimeter to about 2.0 Joules per square centimeter. In embodiments the radiation or photo-cure adhesive can be, for example, a UV pressure sensitive adhesive (PSA), which can, for example, post cure to a tough, durable but flexible solid. In embodiments the photo-cure adhesive can be, for example, electron beam curable.

In the foregoing processes the backing sheet alternatively can be a second transparent sheet, for example, identical or similar to the first transparent sheet to provide a two-sided or double-sided transparent article with an optional transparent, semi-transparent or opaque core. The alternative transparent backing sheet can be a second sheet having a first smooth side and a second side having a lenticulated region and wherein the first smooth side of the transparent backing sheet optionally contacts the adhesive layer before combining with the imaged transparent sheet. Thus the present invention in embodiments provides a process for making an lenticular card article comprising:

providing a first transparent sheet having a first smooth side and a second side with a lenticulated region, the transparent sheet having a printed image on the first smooth side and an adhesive layer over the printed image areas and non-image areas of the first smooth side; and combining by nipping a second transparent sheet having a first smooth side and a second side with a lenticulated region together with the first transparent sheet on the adhesive layer side of the first transparent sheet, wherein the first smooth side second transparent sheet contacts the adhesive layer.

In the above-mentioned processes the backing sheet can be, for example, paper, resin, plastic, glass, rubber, metal, alloy, or combinations thereof. In the above mentioned processes the backing sheet can be, for example, polystyrene, polyvinyl chloride (PVC), PVC laminated polystyrene, compression laminated polystyrene, compression laminated PVC, polyester, polyolefins such as polyethylene, polypropylene, and the like, ABS, acrylics, epoxies, polyurethanes, polycarbonates, or combinations or laminates thereof. In the above mentioned processes the backing sheet can be, for example, opaque, transparent or semi-transparent. In the above mentioned processes the transparent sheet can be configured in the processing machinery as a continuous web. Similarly, the backing sheet can be configured in the processing machinery as a continuous web. The above mentioned processes can optionally further comprise applying a primer layer to the smooth side of the transparent sheet prior to applying an image layer or the adhesive layer. The above mentioned processes can optionally further comprise applying a primer layer to the backing sheet prior to applying an image layer or the adhesive layer. The above mentioned processes can optionally further comprise applying a primer layer to the backing sheet after applying an image layer or the adhesive layer. Various primer or adhesion promoter compositions are commercially available, and one skilled in the art can readily select a particular adhesion promoter composition for use in the present invention depending upon, for example, the composition of the base film layers contacted and the particular formulation of the adhesive selected, such as a thermo-setting resin. An example of a primer layer is 16330 UV curable primer containing a benzophenone initiator, which primer is commercially available from Northwest Coatings Corp., Oak Creek, Wis. The primer layer when applied to the lenticular sheet or backing sheet can provide superior adhesion of the ink and adhesive layer to either sheet and provide a superior destructive bond between adjacent layers. In the above mentioned processes the transparent sheet can be, for example, from about 10 mils to about 26 mils thick and the backing sheet can be from about 4 mils to about 20 mils thick. The printed image areas are preferably printed in "reverse-read" or "wrong-read" format, that is, reversed, backwards, or mirror image, such that the resulting image when viewed through the outer surface of the transparent lenticular sheet by an observer or machine sensor is "right-read" such that the highest possible original image fidelity is retained in the observed printed image. The printed image areas preferably include a colored ink, for example, one or more conventional litho-ink formulations or UV curable inks. The printed image areas can include one or many colored inks, such as from 2 to about 10 different colored inks, for example, with a single primary color (R, G, B), four color process color (C, M, Y, K), white (W), a custom or spot color, such as those known colors available from PANTONE®, and the like suppliers, and combinations thereof.

In the above mentioned processes the adhesive can be applied to either or both the transparent sheet or the backing sheet with any suitable means, for example, a roll coater, spray coater, a curtain coater, and like devices, and preferably a screen press through a screen.

In the above mentioned processes the nipping the paired sheets with a nip roller can be accomplished, for example, with a nip roller pair which applies, for example, from about 10 to about 1,000 p.s.i. The applied pressure can be from about 0 to about 10 bar, for example, a typical and suitable operating pressure is from about 7 to about 8.5 bar. The above processes can further include an optional core sheet interposed between the transparent sheet and the backing sheet and as illustrated herein. The core sheet can be transparent, semi-transparent, or opaque. The above processes can further include where the resulting combined sheets are cut or punched into individual finished pieces, for example, with an on-line slitter or punch press.

In embodiments the present invention provides a lenticular card prepared by the process according to any one of the above mentioned processes comprising:

an imaged transparent sheet having a first front surface with a smooth region and a lenticulated region, and a second rear surface bearing an image;
a core sheet bonded to the transparent sheet with an adhesive; and
a backing sheet bonded to the core sheet with an adhesive.

The lenticular card article prepared by the above process can further comprise where the resulting card can be a secure card article which can be tamper resistant, tamper evident, or both, and which features are known to those skilled in the art and which feature or features can be readily incorporated in the manufacture of the above mentioned lenticular card article, for example, in materials of construction, processing, finishing, or application. The lenticular card article prepared by the above process can further comprise including an image on the non-bonded surface of the backing sheet, for example, an image provided on the outer surface of the card article, such as a thermal image, an ink jet image, an encodable magnetic stripe, and the like marking technologies.

The lenticular card article prepared by the above processes can have, for example, a thickness of from about 10 to about 40 mils, such as preferably a thickness of about 30 mils plus or minus about 1.5 mils, and a finished trim size, for example, of about 3⅜ inches wide by about 2-⅛ inches high. The front surface of the transparent sheet can be, for example, extruded and can include a front surface with both one or more lenticulated regions and one or more smooth regions. In embodiments the surface area of the front surface of the transparent sheet can be, for example, about one half lenticulated region and about one half smooth region. In other embodiments the front surface can be, for example, from about 10 to about 75 percent lenticulated region and from about 90 to about 25 percent smooth region.

Referring to the Figures, FIG. 1 illustrates a lenticular card embodiment of the present invention. Backing sheet 20, for example, an opaque or clear plastic such as a vinyl laminate layer, is coated with an adhesive layer 30, for example but not limited to, a glue or resin formulation. An optional core sheet 35 (not shown), for example, an opaque or clear plastic sheet, can be situated between adhesive layer 30 and image layer 40. It is understood that when an optional core sheet 35 is present a second adhesive layer 37 (not shown) is preferred between core sheet 35 and the image layer 40. Image layer 40 can be, for example, a curable ink. The lenticular top sheet 50 can be, for example, a clear plastic sheet. An optional primer layer (not shown) can be interposed between layers 20-30, 30-40, or 40-50.

Figure 2:
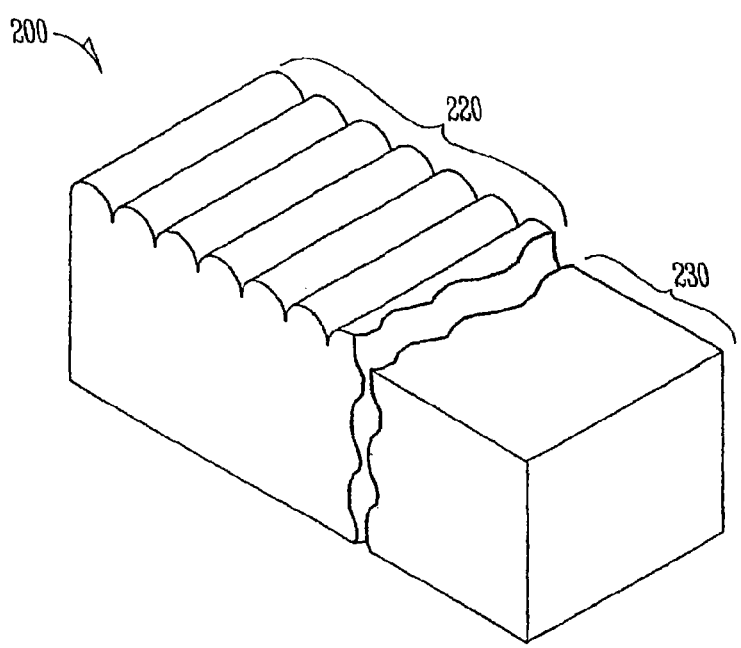
FIG. 2 illustrates an embodiment of the present invention showing a perspective view of a card having a top or outer surface with both a partial lenticular area and a partial smooth area.

In FIG. 2 there is shown a perspective view of an exemplary card 200 having a top or outer surface with both a partial lenticular area and a partial smooth area. The partial lenticulated surface area can be formed by limiting or restricting the lenticulation formation process, for example, to one side, to restricted areas of the top surface of the card, and like approaches. Card 200 is shown with a portion of the top surface with partial lenticulated surface area 220, and a portion of the top surface with a partial smooth surface area 230.

Figure 3:
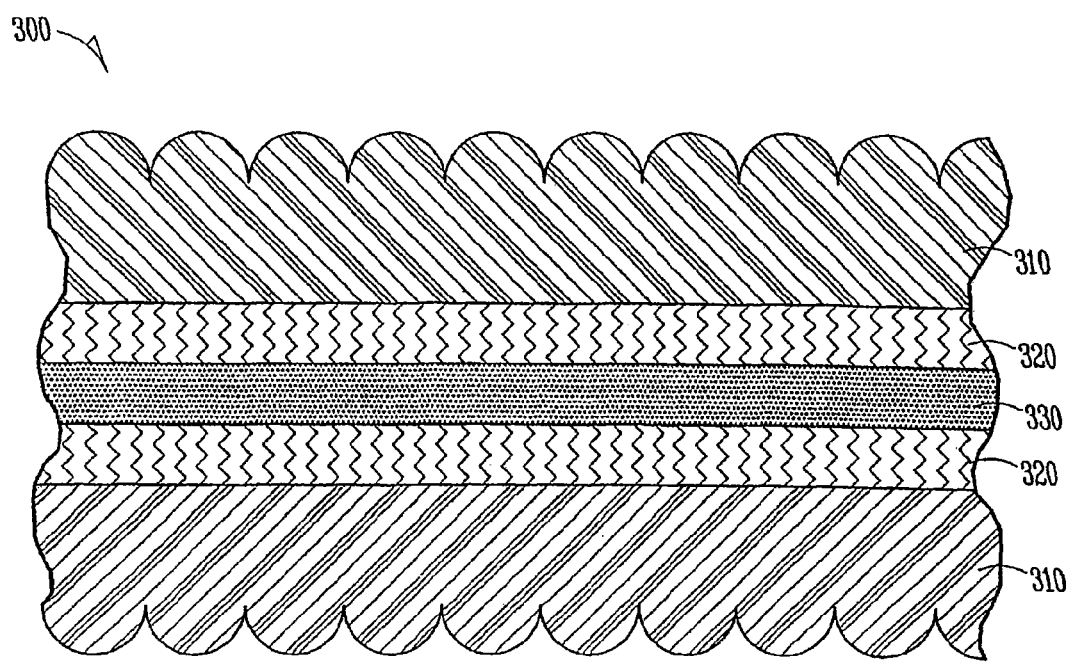
FIG. 3 illustrates a lenticular card embodiment of the present invention showing a section view of a card having both a top outer lenticular surface and a bottom outer lenticular surface.

FIG. 3 shows a sectional view of a card 300 having a dual or two-sided lenticular outer surface 310, that is where both the top outer surface and a bottom outer surface are partially or completely lenticular or lenticulated. The lenticular top outer surface 310 and the lenticular bottom outer surfaces 310 can be transparent or translucent and constructed of, for example, a clear plastic. Printed image layer 320 can be, for example, a conventional based printing ink or a UV curable ink or inks. Adhesive layer 330 can be, for example, a resin, a glue, a curable polymer, or like materials. An optional primer layer (not shown) can be, for example, interposed between layers 310 and 320. It will be readily understood that a card having the two-sided lenticular surface or lenticular surfaces as illustrated here, both sides as in FIG. 3 can have complete or partial lenticulation areas on either or both outer surface as suggested for the one-sided lenticular surface in FIG. 2. The card 300 can have an optional core sheet (not shown) situated between adhesive layers 330 on both sides.

EXAMPLE I

Lenticulated Card No.
Materials and Layer Specifications
Transparent Sheet: 18 mils 75 LPI APET Clear Lens
Image Inks: 4-Color Process UV litho-inks; 1 Hit Opaque White UV litho-ink
Core Sheet: 10 mils white opaque polystyrene
Adhesive: solvent based moisture urethane adhesive
Backing Sheet: 2 mils clear PVC laminating film The core sheet and the backing sheet were fused together in a compression laminator, for example, with a platen with thermal heating on the 2 mils clear PVC laminating film. The adhesive failed when PVC was used as the backing sheet, that is, the moisture cure urethane used in this experiment did not satisfactorily bond to the PVC.

Process 1

A transparent sheet of 18 mils clear 75 LPI APET (polyester) lenticular lens was printed with an interlaced animated image matching the frequency of the 75 LPI pitch lenticular lens. The lens used could be made thicker or thinner and made from polymer materials other than APET polyester, including but not limited to, for example, vinyl, PETG, polycarbonate, and like materials. Inks were printed on the transparent sheet using a litho press configured with UV Lamps, such as metal halide or mercury lamps, and irradiation from the UV lamps was used to cure the printed inks.

One or more process colors or PANTONE® Matching System (PMS, i.e. a color standard for non-process colors) colors can be printed in conjunction with, or in place of, the 4-color process image. The total thickness of the imaged transparent sheet, that is, the lenticular sheet plus printed image(s) is about 18 mils. The styrene core has two bonding surfaces. One of its surfaces contacts the adhesive that adheres the core sheet to the printed lenticular sheet. The other surface can optionally have one or more image colors and is laminated with a clear vinyl laminate sheet which seals the printed image colors. The laminated vinyl surface, as either the backing sheet or optional core, provides a flat surface for additional optional thermal imaging and can withstand heat from either or both application of a hot stamped magnetic image and heat from thermal imaging processes. The styrene core sheet used was 10 mils white opaque litho-grade polystyrene. A thinner or thicker polystyrene layer can be used as long as the combined thickness of the total construction of the vinyl laminate, polystyrene, and the printed lenticular sheet, including all adhesive layers is approximately 30 mils to satisfy, for example, ISO/IEC card standards. The polystyrene core sheet used was matte/matte finish, however matte/gloss/ or gloss/gloss combination finishes could alternatively be used. The polystyrene core sheet was printed with one or more colors on its backside with litho UV inks using, for example, a UV configured printing press. The resulting printed or imaged polystyrene core sheet was thereafter compression laminated on its back side with a 2 mils thick vinyl compression laminating film. The film was matte/matte finish and had a heat activated adhesive applied to one side. After compression lamination, the resulting printed and laminated polystyrene sheets were registered and square cut to match the layback and guide of the printed lenticular sheet. Ideally, the size of the cut polystyrene and lenticular sheet should be approximately the same size. A solvent-based (ethyl acetate) moisture cure urethane AV6370/with CA600 catalyst, available from Pierce and Stevens, was screen printed at about 50% solids on the printed lenticular sheet, using a 137 Mesh screen. However, it is noted that other moisture cure urethane or solvent-less urethane adhesives could alternatively be used. Although the application method for the adhesive used was a screen press, it is noted that, for example, a roll coater, rotary letter press, rotary screen press, curtain coater, and the like coater devices and coating methods could also be used. The combined vinyl laminate and the polystyrene core sheets were transported, adhesive side up, with a conveyor to a heat tunnel and heated to activate the adhesive upon reaching a temperature of about 160 degrees F. and to flash solvents from the adhesive layer. It is readily appreciated that some moisture cure urethanes do not need to be activated with elevated temperatures and that room temperature may be satisfactory to accomplish activation. After solvent was removed, the adhesive was a tacky pressure sensitive adhesive. The adhesive activated sheets were then transported to an air conditioner unit to remove excess heat that can cause distortion in the plastic. Adhesive activated sheets mounted without this cooling step tended to warp if mounted warm. Adhesive activated sheets were then combined, that is mounted, with the lenticulated sheet and passed through a nip roller. The sheets were jogged to a common guide and gripper so the lenticulated sheet image matched the combined backing sheet copy within a reasonable tolerance, for example, of about plus or minus 0.015 inches. The sheets were stacked and left at ambient temperatures of about 25° C. to complete polymerization and full cure. The specified full cure for the adhesive was between about 48 and about 96 hours. Final cure was tested by the pull strength of the bond. Piece parts corresponding to cards were then punched from the cure composite sheet using a Print Machinery Company (PMC) die, that is a hollow steel die process. The resulting cards were then magnetically striped by applying a one-half inch wide magnetic film using a Franklin Hot stamped magnetic film applicator machine. An alternative process includes laminating the styrene core using a flush magnetic laminate film wherein the magnetic material is incorporated into the laminate to eliminate a separate step of applying a magnetic strip. Cards were then thermally imaged and encoded using a Data Card Machine. The adhesive bond strength of the resulting cards of this Example was less satisfactory, for example, in curing, or with vinyl or polyester backing materials compared with other backing materials such as styrene.

EXAMPLE II

Lenticulated Card No. 2.
Materials and Layer Specifications
Transparent Sheet: 18 mils 75 LPI APET Clear Lens
Image Inks: 4-Color Process UV litho-inks; 1 Hit Opaque White UV litho-ink;
Black Ink—UV Cured
Adhesive: UV Curable Radcure 10 PSA-B (a 2-part pressure sensitive adhesive that cures to a solid over time)
Core Sheet: 10 mils white opaque polystyrene core
Adhesive: UV Curable Radcure 10 PSA-B
Backing Sheet: 2 mils clear PVC laminating film
  Note: this adhesive system failed to provide a destructive bond when PVC was used as the backing sheet.

Process 2
The process of Example I was repeated with the exception that a UV curable pressure sensitive adhesive (PSA), Radcure 10 PSA-B, a two-part adhesive, was mixed according to manufacturer recommendations and was screen printed on the printed lenticular sheet, using a 137 Mesh screen. UV light irradiation was used on a 30 inch wide web running at 60 feet per minute and using two 300 Watts per inch medium pressure mercury vapor UV lamps to activate the adhesive layer, and the adhesive became pressure sensitive. The plastic polystyrene core was then mounted to the lenticular sheet bearing the adhesive and then combined with the vinyl backing sheet using the same adhesive used between the core and backer sheet, and the combined backer, core, and lenticular sheets were nipped together with a nip roller. Over time, of about 24-48 hours, the adhesive post cured to a flexible solid. The sheets were transported; adhesive side up, via a conveyor to expose the adhesive to the manufacturer's recommended amount of UV light. The core sheet, mils laminated on one side with 2 mils laminating film bearing the activated adhesive, was mounted to the imaged lenticular sheet and run through a nip roller. The sheets were jogged to a common guide and gripper so the lens image matched the back copy within a reasonable tolerance. The sheets were stacked and left to polymerize to full cure. For this adhesive a period of 48 hours was specified. Final cure strength was tested by pull strength of the bond. Piece Parts were made as punched cards; the cards were magnetically striped and thermally imaged and encoded as in Example 1. Analysis of the resulting cards indicated that the UV adhesive used in this process did not work as well for curing to a vinyl or polyester backing sheets compared to a superior result for a polystyrene backing. About 500,000 cards were produced with this process.

EXAMPLE III

Lenticulated Card No. 3.
Materials and Layer Specifications
Transparent Sheet: 18 mils 75 LPI APET Clear Lens
(Alternatively, a PVC lens was used and did not have curl as was the situation with an APET and PVC backing combinations)
Image Inks: 4-Color Process UV litho-inks; 1 Hit Opaque White UV litho-ink;
Black Ink—UV Cured
Adhesive: UV activated acrylate urethane adhesive (for example Dymax 3-3094, a polyurethane oligomer mixture commercially available from Dymax Corp., Torrington, Conn.)
Core Sheet: 8 mils White PVC Core
Adhesive: UV activated acrylate urethane (Dymax 3-3094)
Backing Sheet: 2 mils clear PVC laminating film (applied to both sides of an 8 mils white PVC core)
  This adhesive worked well and provided a desired destructive bond when PVC was used as the backing sheet which sheet could he either laminated or non-laminated.
Process 3
The process of Example II was repeated with the exception that an alternative UV curable acrylate-urethane adhesive was screen printed on the pre-printed lenticular sheet, using a 230 Mesh screen. Dymax 3-3094, a one-part adhesive was screen printed on the laminated PVC backing. The adhesive was activated after mounting the lenticular and the core sheets together. The adhesive could be cured instantly, for example, by one or more UV lamp(s) flood outputting with 365 nm wavelength of UV light, even if the radiation cure was through a partially translucent, that is semi-opaque with a relative opacity of about 30 percent, such as a printed lenticular sheet imaged with 1-color opaque white. After the nip roller, the sheets were conveyed with the printed lens on top, and exposed to the manufacturer's recommended dose of UV light. UV dose levels were determined experimentally with both 300 Watt lamps at maximum illumination. The dose levels can depend on a number of factors, such as belt speed and the color adsorption properties and the amount of inks used. An adhesive bond formed instantly. The sheets were stacked. Piece parts were made by punching cards. The punched cards were magnetically striped and thermally imaged and encoded as in Example I. To meet the ISO/IEC specification a test was to bend the corners of the card, repeatedly back and forth, until the backing or the lens cracked but before layers separated. The cards prepared and tested in this example showed no layer separation prior to cracking.

EXAMPLE IV

2-Sided Lenticulated Card No. 4.
Materials and Layer Specifications
Transparent Top Sheet: 18 mils 75 LPI APET Clear Lens
Image Inks: 4-Color Process UV litho-inks; 1 Hit Opaque White UV litho-ink;
Black Ink—UV Cured
Adhesive: UV activated acrylate urethane adhesive (Alternatively, Dymax adhesive could be used here in combination with any of the core materials, or a moisture cure adhesives such as the urethanes could be used with, for example, polystyrene or polyester cores) Optional Core Sheet: 8 mils White PVC Core or an 8 mils White polystyrene core (un-laminated)
Optional Adhesive: UV activated acrylate urethane adhesive if Optional Core Sheet is used
Image Inks: 4-Color Process UV litho-inks; 1 Hit Opaque White UV litho-ink;
Black Ink—UV Cured
Backing Sheet or Transparent Bottom Sheet: 18 mils 75 LPI APET Clear Lens (same as the Transparent Top Sheet)
Process 4

The process of Example II was repeated with the exception that the backer sheet was a lenticular sheet. All of the above mentioned adhesives are satisfactory here.

All cited publications, patents, and patent documents are incorporated by reference herein in their entirety. The invention has been described with reference to various specific and preferred embodiments and techniques. However, it should be understood that many variations and modifications may be made while remaining within the spirit and scope of the invention.

What is claimed is:

1. A card presenting high quality image properties and desirable physical characteristics, the card comprising:
   a polymeric backing sheet having a backing sheet thickness;
   a lens sheet having a lens sheet thickness, wherein at least a portion of a first side of the lens sheet comprises a plurality of lenses, wherein a ratio of the lens sheet thickness to the backing sheet thickness is from about 0.5 to about 6.5;
   an image layer viewable through the lens sheet;
   an adhesive layer interposed between the polymeric backing sheet and the lens sheet, wherein the polymeric backing sheet and the lens sheet of the resulting card are physically inseparable without at least partially destroying the polymeric backing sheet, or the lens sheet; and
   a machine-readable image on a side of the polymeric backing sheet opposite the adhesive layer.

2. The card of claim 1, wherein the plurality of lenses has a pitch of about 70 to about 100 lenses per inch.

3. The card of claim 1, wherein the lenses are lenticular lenses.

4. The card of claim 1, wherein the card has an overall thickness of about ten to about forty mil.

5. The card of claim 4, wherein the overall thickness is about thirty mil plus or minus ten percent.

6. The card of claim 5, wherein the backing sheet thickness is from about four to about twenty mil.

7. The card of claim 5, wherein the lens sheet thickness is from about ten to about twenty-six mil.

8. The card of claim 1, wherein the adhesive layer comprises a radiation curable adhesive or a moisture cure adhesive.

9. The card of claim 1, wherein the polymeric backing sheet is chosen from polystyrene, polyvinyl chloride (PVC), polyester film laminated PVC, polyester film laminated polystyrene, PVC film laminated PVC, PVC laminated polystyrene, PVC film laminated polystyrene, compression laminated polystyrene, compression laminated PVC, polyester, polyolefin, polyethylene, polypropylene, ABS, acrylic, epoxy, polyurethane, and polycarbonate.

10. The card of claim 1, wherein the lens sheet material is chosen from polyethylene terephthalate glycol (PETG), amorphous polyethylene terephthalate (APET), and polyvinylchloride (PVC).

11. The card of claim 1, wherein the machine-readable image comprises a bar code or a magnetic stripe.

12. The card of claim 1, wherein the plurality of lenses comprises about ten to about seventy-five percent of the first side.

13. The card of claim 1, wherein the plurality of lenses comprises one hundred percent of the first side.

14. The card of claim 1, wherein the card has a finished trim size of about 3 ⅜ inches by about 2 ⅛ inches.

15. A card presenting high quality image properties and desirable physical characteristics, the card comprising:
   a polymeric backing sheet having a backing sheet thickness;
   a lens sheet comprising a polymeric material, wherein at least a portion of a first side of the lens sheet comprises a plurality of lenses, the plurality of lenses having a pitch of about 70 to about 100 lenses per inch;
   an image layer viewable through the lens sheet; and
   an adhesive layer interposed between the polymeric backing sheet and the lens sheet, wherein the polymeric backing sheet and the lens sheet of the resulting card are physically inseparable without at least partially destroying the polymeric backing sheet, or the lens sheet;
   wherein the card has a total thickness of about 30 mils +/−10%, and a finished trim size to about 3 ⅜ inches by about 2 ⅛ inches.

16. The card of claim 15, wherein the lenses are lenticular lenses.

17. The card of claim 15, wherein the backing sheet thickness is from about four to about twenty mil.

18. The card of claim 15, wherein the lens sheet thickness is from about ten to about twenty-six mil.

19. The card of claim 15, wherein the adhesive layer comprises a radiation curable adhesive or a moisture cure adhesive.

20. The card of claim 15, wherein the polymeric backing sheet is chosen from polystyrene, polyvinyl chloride (PVC), polyester film laminated PVC, polyester film laminated polystyrene, PVC film laminated PVC, PVC laminated polystyrene, PVC film laminated polystyrene, compression laminated polystyrene, compression laminated PVC, polyester, polyolefin, polyethylene, polypropylene, ABS, acrylic, epoxy, polyurethane, and polycarbonate.

21. The card of claim 15, wherein the lens sheet material is chosen from polyethylene terephthalate glycol (PETG), amorphous polyethylene terephthalate (APET), and polyvinylchloride (PVC).

22. The card of claim 15, wherein the machine-readable image comprises a bar code or a magnetic stripe.

23. The card of claim 15, wherein the plurality of lenses comprises about ten to about seventy-five percent of the first side.

24. The card of claim 15, wherein the plurality of lenses comprises one hundred percent of the first side.

* * * * *